Aug. 25, 1942.   W. R. KOCH   2,293,831
SIGNAL DETECTING SYSTEM
Filed Nov. 30, 1939   3 Sheets-Sheet 1

NO SIGNAL

TUNED TO LOWER FREQUENCY SIDE

TUNED TO MID-BAND

TUNED TO HIGHER FREQUENCY SIDE

Inventor
Winfield R. Koch
By
Attorney

Aug. 25, 1942.  W. R. KOCH  2,293,831
SIGNAL DETECTING SYSTEM
Filed Nov. 30, 1939   3 Sheets-Sheet 2
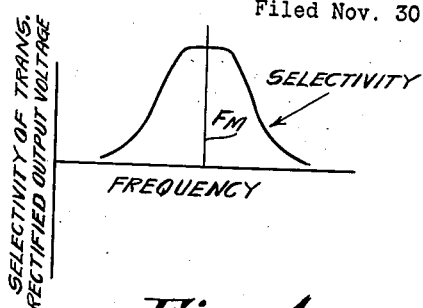
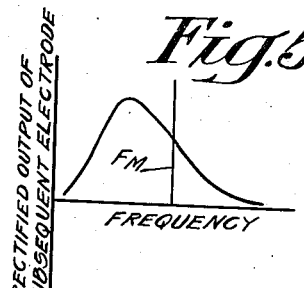
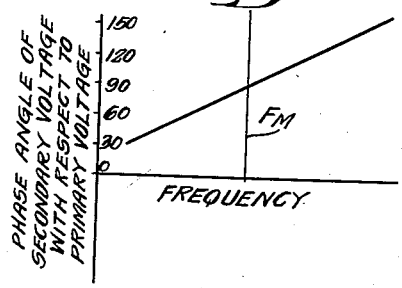
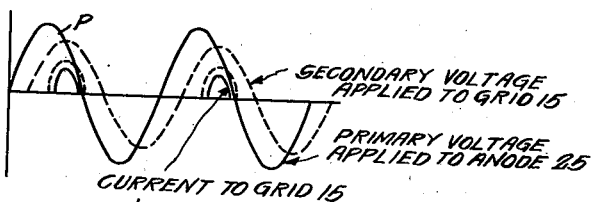
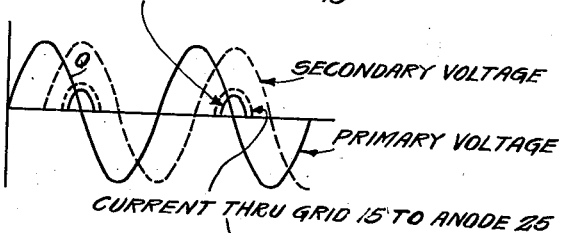
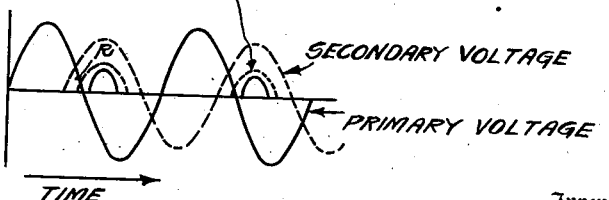
Inventor
Winfield R. Koch
By
Attorney Aug. 25, 1942.  W. R. KOCH  2,293,831
SIGNAL DETECTING SYSTEM
Filed Nov. 30, 1939   3 Sheets-Sheet 3
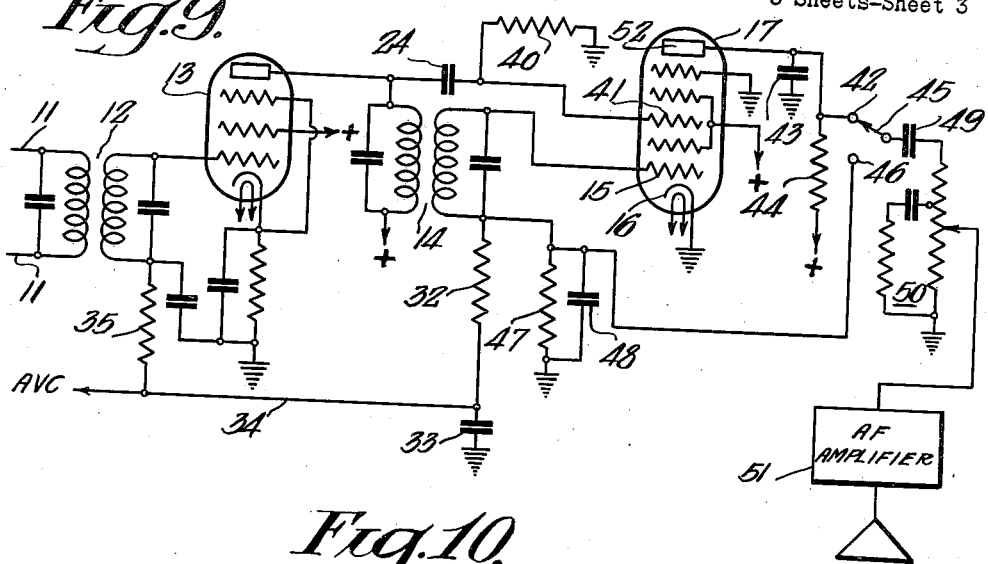
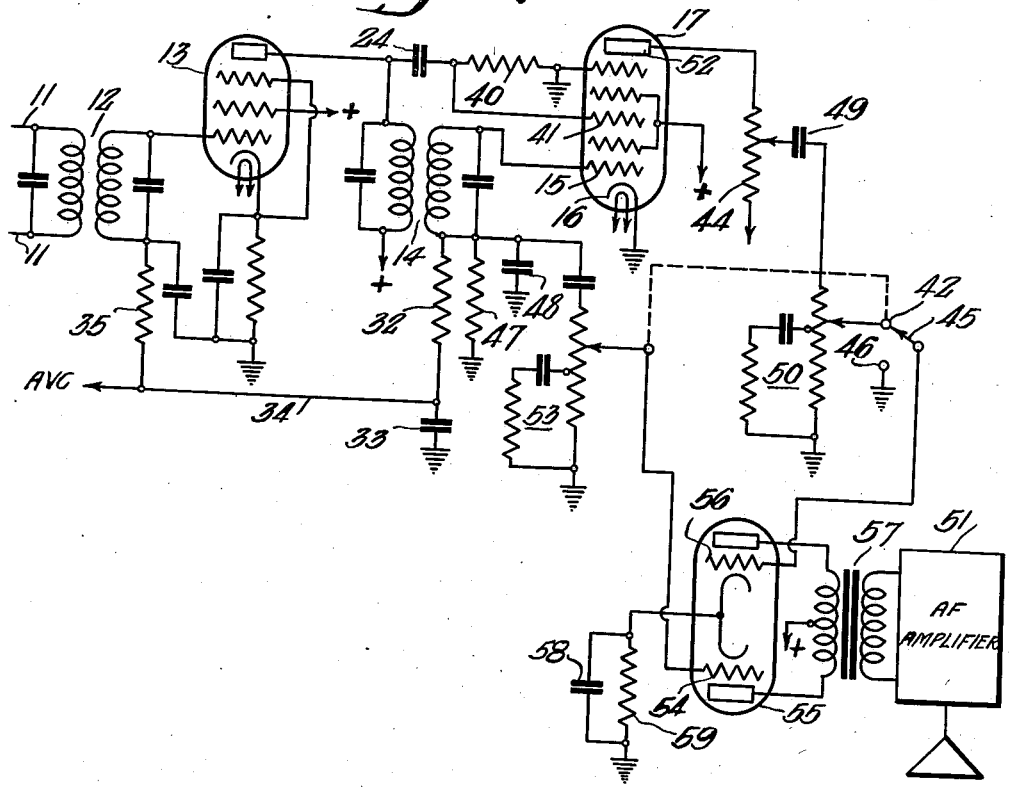
Inventor
Winfield R. Koch
By
Attorney Patented Aug. 25, 1942

2,293,831

UNITED STATES PATENT OFFICE 2,293,831

SIGNAL DETECTING SYSTEM

Winfield R. Koch, Haddonfield, N. J., assignor to Radio Corporation of America, a corporation of Delaware Application November 30, 1939, Serial No. 306,839

8 Claims. (Cl. 250—20)

This invention relates to detecting systems such as are adapted to detect selectively signals which are amplitude modulated or signals which are frequency modulated. It has for its principal object the provision of an improved system and method of operation which may be readily adapted to detect either type of signal or to produce results dependent on the conjoint action of the different signal detecting elements.

It is well known that the phase relation between the primary and secondary voltages of a coupling transformer varies with change in the frequency of the primary voltage, and that the amplitude of the resultant of these voltages is proportional to such frequency change. This resultant voltage has been utilized heretofore to produce a variation in amplitude which varies as the frequency of a frequency modulated signal. Also various other means have been provided for producing an amplitude variation dependent on variation in frequency.

The illustrated embodiments of the present invention include means for utilizing the transformer primary and secondary voltage resultant to produce a direct potential which varies in accordance with the applied signal frequency. To this end, the primary and secondary voltages are applied to different electron discharge device electrodes, one of which functions to detect signals of the amplitude modulated type and also cooperates with the other of said electrodes for the detection of signals of the frequency modulated type. As hereinafter explained, the outputs from these two electrodes may be conjointly utilized to produce a tuning indication, to balance out noise at the mid-frequency of the frequency modulated signal or the like.

The invention will be better understood from the following description considered in connection with the accompanying drawings, and its scope is indicated by the appended claims.

Referring to the drawings:

Figures 2a to 2d and 3 to 8 are explanatory diagrams relating to the operation of the systems of Figs. 1, 9 and 10;

Figure 9 is a wiring diagram of a channel adapted to receive and demodulate either amplitude or frequency modulated signals; and Figure 10 is a wiring diagram of a similar channel wherein the amplitude detector element is utilized to balance out noise impulses at the mid-frequency of the received frequency modulated signal.

Figure 1:
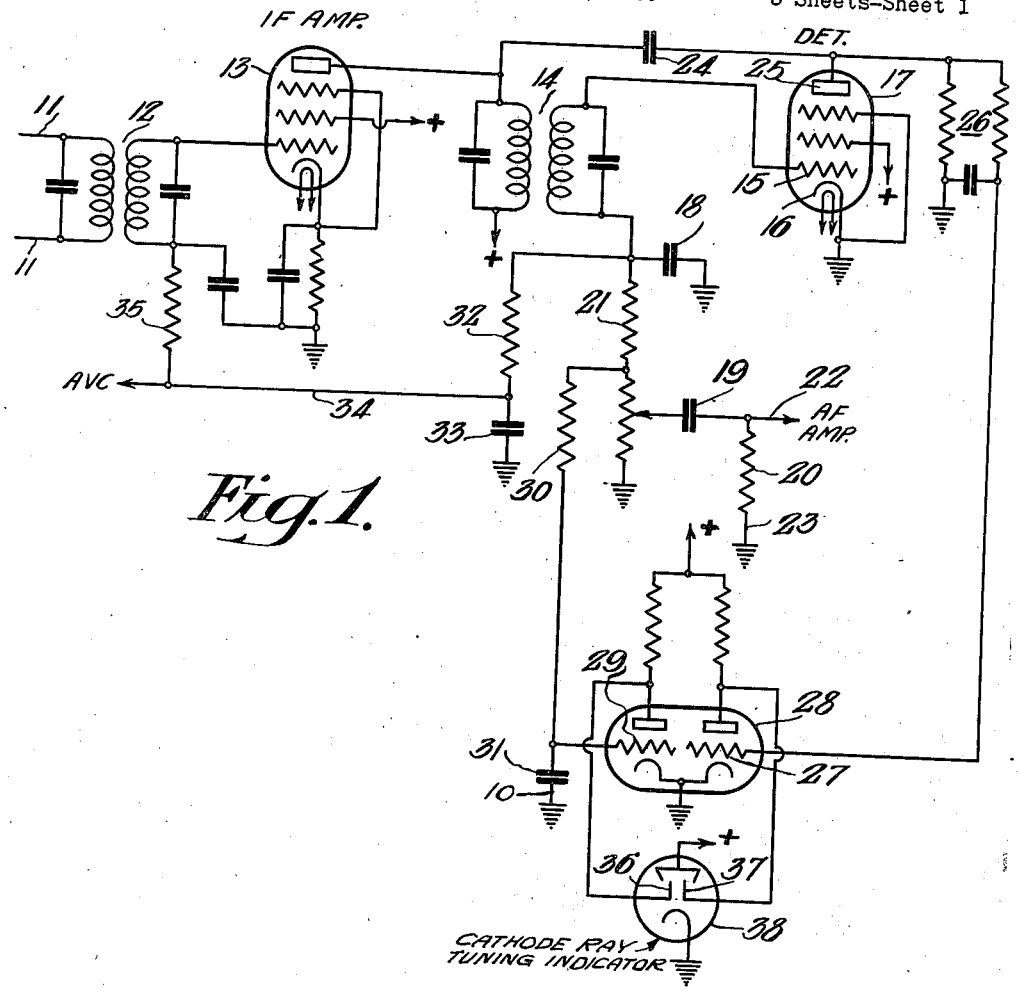
Figure 1 illustrates the system as utilized to indicate the tuning of an amplitude-modulated signal receiver.

The circuit of Fig. 1 includes a pair of intermediate frequency input terminals 11, from which amplitude modulated signals are supplied through a transformer 12, an amplifier 13 and a transformer 14 to the amplitude modulated signal detecting electrodes 15 and 16 of an electron discharge device 17. The signal thus detected is supplied through a filter network 21 and 18 and a coupling capacitor and resistor 19 and 20 to the audio frequency amplifier input leads 22 and 23.

For indicating when the channel is tuned to the carrier of the incoming signal, the high voltage primary terminal of the transformer 14 is connected through a capacitor 24 to the anode 25 of the electron discharge device 17. This anode is connected through a filter network 26 to one control grid 27 of a duplex or twin-triode amplifier. As hereinafter explained in connection with the various explanatory figures of the drawings, the electrodes 15, 16 and 25 of the device 17 function to produce at the grid 27 a voltage of magnitude determined by the difference between the signal carrier frequency and the frequency to which the circuit is tuned.

The other grid 29 of the duplex amplifier 28 is connected through resistors 30 and 21 to the low voltage secondary terminal of the transformer 14, and through a capacitor 31 to the ground terminal 10. With these connections, the audio frequency component of the detected current is filtered out by the network 21, 30 and 31, and there is applied to the grid 29 a unidirectional potential which is of substantially constant value if a substantially flat automatic volume control means, such as that indicated at 34 and 35, are provided. Resistor 32 and capacitor 33 filter the audio frequency components from the automatic volume control voltage on the lead 34.

Connected to the output circuits of the duplex or twin triode amplifier 28 are the two control electrodes 36 and 37 of a cathode ray indicator tube 38 which may be of the 6AF6G type and which functions to produce indications such as those illustrated by Figs. 2a to 2d.

The operation of the system of Fig. 1 will be readily understood upon consideration of Figs. 3 to 8 and their explanatory legends. Thus, the detected output from the grid 15 of the device 17 follows the selectivity curve illustrated by Fig. 3, the output from the anode 25 of this device follows the selectivity curve of Fig. 5, and the change in phase relation between the primary and secondary voltages of the transformer 14 is in accordance with the curve of Fig. 4. In all these curves, the mid-frequency should be understood to be F$_M$.

Figure 2A:
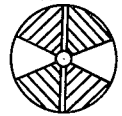
Figure 2B:
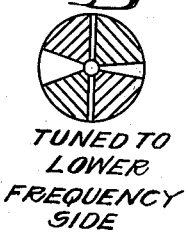
Figure 2C:

From these curves, it is apparent that the outputs from the grid 15 and the anode 25 of Fig. 1 can be made equal only at one frequency. By suitable adjustment of one of the output resistors, they may be made equal at the mid-band frequency so that the indication illustrated by Fig. 2c is exhibited by the cathode ray tube 38.

Figure 2D:

The curves of Figs. 6, 7 and 8 show different phase relations between the primary and secondary voltages of the transformer 14 (Fig. 1) and the relation of these voltages to the currents of the grid and anode circuits of the device 17. It will be observed that current flows in the circuit of the grid 15 only during the peak portion of the secondary voltage, that current flows through the grid 15 to the anode 25 through a slightly longer period, and that the voltage of the anode 25 is shifted from a value P to a lower value Q and to a still lower value R as the secondary voltage responds to a change from a frequency above the mid-band to a frequency below the mid-band. The indication corresponding to frequencies higher than the mid-band frequency is illustrated by Fig. 2d and to those below the mid-band by Fig. 2b.

The usefulness of the circuit of Fig. 1, however, is not restricted to the field of tuning indication, but may be adapted to various other purposes.

Fig. 9 illustrates a modified circuit which is adapted to detect selectively signals of the amplitude modulated type or of the frequency modulated type. This modified circuit differs from that of Fig. 1 in that the detector device 17 includes a greater number of electrodes and the high voltage side of the transformer primary is coupled through the capacitor 24 and a resistor 40 to the No. 3 grid 41 of the device 17. The output circuit of the device 17 is coupled through a capacitor 43 and a resistor 44 to one fixed terminal 42 of a switch 45, and the low voltage secondary terminal of the transformer 14 is connected to another fixed terminal 46 of the switch 45, this low voltage secondary terminal being also grounded through a filter network 47 and 48.

With the switch 45 in its illustrated position, the anode or output circuit of the device 17 is connected through a coupling capacitor 49 and a compensated volume control network 50 to an audio frequency amplifier 51, and the circuit is adapted for the detection of frequency modulated signals. When the switch contacts 45 and 46 are brought into engagement, the low voltage transformer terminal is similarly connected to the amplifier 51 and the circuit is adapted to detect amplitude modulated signals.

As will be readily understood, the grid 15 functions as a normal amplitude modulation detector giving automatic volume control voltage and audio output with normal selectivity secured from the transformer 14. The grid 41 functions as a grid leak detector but, since the intermediate frequency voltage applied to the grid 15 varies in phase through the band passed by the transformer, the rectified output of the grid 41 is a maximum at one edge of the band and a minimum at the other edge of the band. In operation of the circuit, it was found that with a few volts positive on the anode 52 and its associated screen, the anode or output current was a maximum when the primary and secondary voltages were in phase, and decreased quite linearly as the phase angle between these was increased.

Since the output of the grid 15 remains constant throughout the band and that of the anode varies as indicated above, the two may be balanced against one another as shown in Fig. 10, so that at the middle of the band the outputs are equal and undesired amplitude modulation will be balanced out during the reception of frequency modulated signals.

To this end, the circuit of the grid 15 may be connected through a compensated volume control network 53 to one control grid 54 of a push-pull device 55, and the circuit of the anode 52 similarly connected to the other control grid 56 of this device. Output from the device 55 is supplied through a transformer 57 to the audio amplifier 51. It should be noted that the compensated volume control circuits 50 and 53 may be ganged together as indicated by broken lines. If a compensated volume control is not required, the circuit may, of course, be somewhat simplified. With either type of detection, the audio frequency transformer has balanced currents through its primary and is therefore improved in operation. A large by-pass capacitor 58, connected in shunt to the cathode resistor 59, is required for best results. An adjustable resistor 44 is included to permit proper balance between the two audio voltages at the mid-band frequency.

I claim as my invention:

1. In a circuit for detecting either amplitude or frequency modulated signals, the combination of a source of signal energy, and output transformer coupled thereto, an electron discharge device including a cathode and a pair of electrodes each provided with an output circuit connected with the cathode, means for subjecting one of said electrodes and the cathode to the primary voltage of said transformer, means for subjecting the other of said electrodes and the cathode to the secondary voltage of said transformer, and means for selecting amplitude and frequency modulation signals from said output circuits.

2. In a circuit for detecting either amplitude or frequency modulated signals, the combination of a source of signal energy, an output transformer coupled thereto, an electron discharge device including a cathode and a pair of electrodes each provided with an output circuit connected with the cathode, means for subjecting one of said electrodes and the cathode to the primary voltage of said transformer, means for subjecting the other of said electrodes and the cathode to the secondary voltage of said transformer, and means for selecting and comparing the voltage output of said circuits.

3. In a circuit for detecting either amplitude or frequency modulated signals, the combination of a source of signal energy, an output transformer coupled thereto, an electron discharge device including a pair of input electrodes, a cathode and an anode, means providing an output circuit between said cathode and anode and an output circuit between one of said input electrodes and the cathode, means for subjecting one of said input electrodes to the primary voltage of said transformer, means for subjecting the other of said input electrodes and the cathode to the secondary voltage of said transformer, and means for deriving an automatic volume control potential from one of said output circuits.

4. The combination of a source of signal energy, an output transformer coupled thereto, an electron discharge device including first and second electrodes each provided with an output circuit, means for subjecting said second electrode to the primary voltage of said transformer and for subjecting said first electrode to the secondary voltage of said transformer whereby detected amplitude modulated signals may be rendered available at the output terminals of the circuit of said first electrode and detected frequency modulated signals may be rendered available at the output terminals of the circuit of said second electrode, a signal utilization circuit, and means for selectively connecting said amplifier circuit to one or the other of said output circuits.

5. The combination of a source of signal energy, an output transformer coupled thereto, an electron discharge device including three electrodes each provided with an output circuit, means for subjecting said second electrode to the primary voltage of said transformer and for subjecting said first electrode to the secondary voltage of said transformer whereby detected amplitude modulated signals may be rendered available at the output terminals of the circuit of said first electrode and detected frequency modulated signals may be rendered available at the output terminals of the circuit of said third electrode, a signal utilization circuit, and means for connecting said circuit to one or the other of said output circuits.

6. The combination of a source of signal energy, an output transformer coupled thereto, an electron discharge device, including a cathode and a pair of electrodes each provided with an output circuit having a return connection to the cathode, means for subjecting one of said electrodes and the cathode to the primary voltage of said transformer, means for subjecting the other of said electrodes and the cathode to the secondary voltage of said transformer, means for deriving an automatic volume control potential from one of said output circuits, and means for deriving detected frequency-modulated signals from the other of said output circuits.

7. The combination of a source of signal energy, an output transformer coupled thereto, an electron discharge device including a cathode and a pair of electrodes each provided with an output circuit having a return connection to the cathode, means for subjecting one of said electrodes and the cathode to the primary voltage of said transformer, means for subjecting the other of said electrodes and the cathode to the secondary voltage of said transformer, and means for deriving and comparing detected signals from said output circuits.

8. The combination of a source of signal energy, an output transformer coupled thereto, an electron discharge device including a cathode and a pair of electrodes each provided with an output circuit having a return connection to the cathode, means for subjecting one of said electrodes and the cathode to the primary voltage of said transformer, means for subjecting the other of said electrodes and the cathode to the secondary voltage of said transformer, means for deriving and comparing detected signals from said output circuits, and means for deriving a controlling potential from one of said output circuits.

WINFIELD R. KOCH.